United States Patent [19]

Visser

[11] 4,159,727

[45] Jul. 3, 1979

[54] POTTING AND REPOTTING MACHINE

[75] Inventor: Anthony Visser, 's-Gravendeel, Netherlands

[73] Assignee: Visser Tuinbouwtechnick en Hout B.V., 's-Gravendeel, Netherlands

[21] Appl. No.: 873,066

[22] Filed: Jan. 27, 1978

[30] Foreign Application Priority Data

Jan. 27, 1977 [NL] Netherlands ................... 7700839

[51] Int. Cl.² .............................................. B65B 1/04
[52] U.S. Cl. .................................... 141/131; 47/1 A; 198/836
[58] Field of Search ............................. 141/129–191, 141/62, 78, 101, 1; 198/836; 47/1 A; 53/36, 239, 282; 214/8.5 G

[56] References Cited

U.S. PATENT DOCUMENTS 3,280,962  10/1966  Stone et al. ..................... 198/836

4,020,881  5/1977  Nöthen ........................... 141/131

*Primary Examiner*—Houston S. Bell, Jr.
*Attorney, Agent, or Firm*—Browdy and Neimark

[57]  ABSTRACT

A potting and repotting machine forming part of an apparatus for filling pots, in particular for filling flower pots and the like with potting soil, is provided with an elongated bin which is open at the top and accommodates an endless chain conveyor fitted with carriers extending transversely to the transport direction, the potting and repotting machine being provided with at least one continuous pot guideway extending longitudinally of the bin and having variable width and depth, the carriers of the endless chain conveyor being designed as pushing members extending in the upper part of the chain above the bottom level of the guideway or guideways, so that the conveyor can be easily adapted to different pot sizes and pot configurations.

7 Claims, 2 Drawing Figures

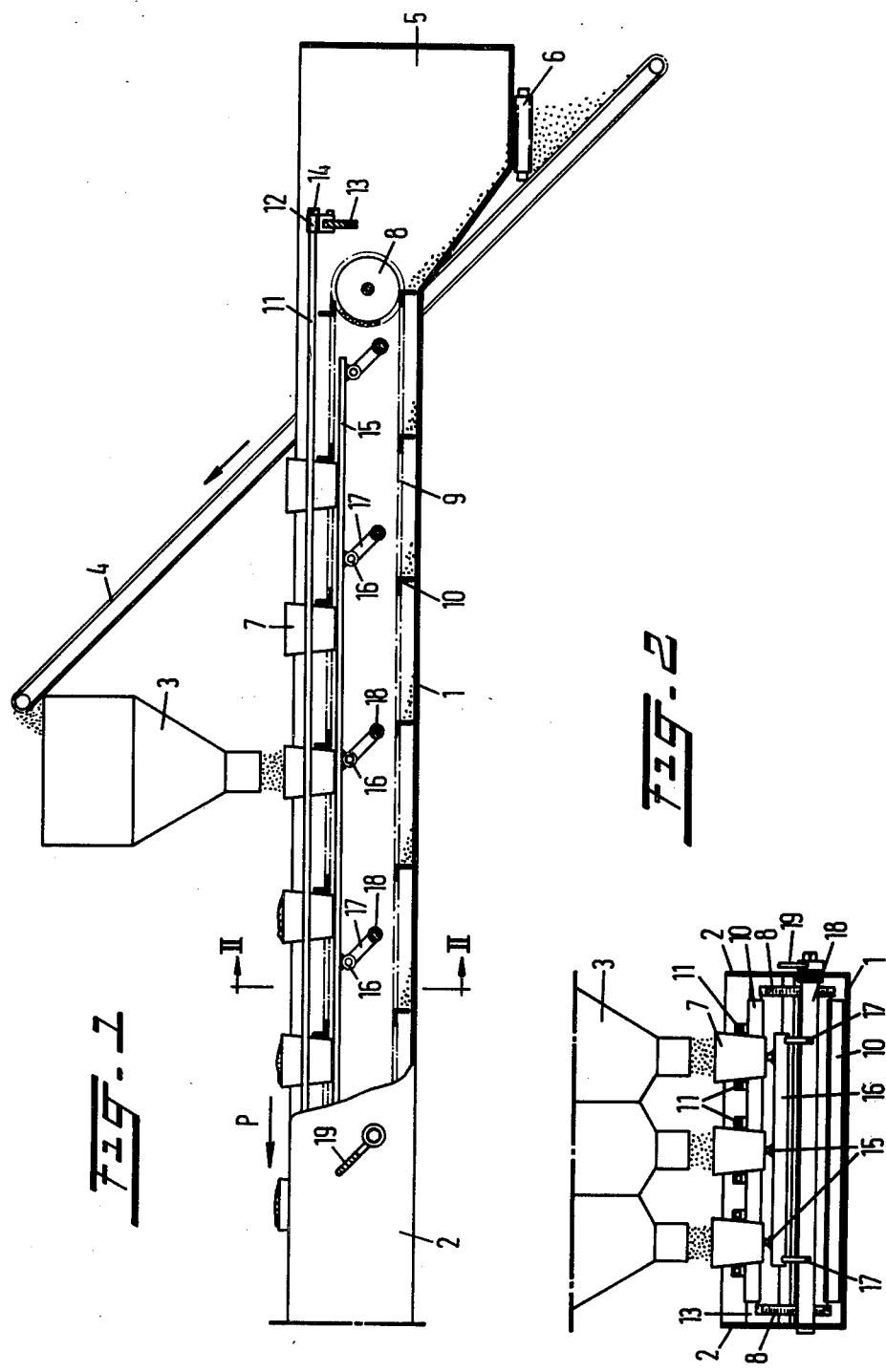

POTTING AND REPOTTING MACHINE

The present invention relates to a potting and repotting machine forming part of an apparatus for filling pots, in particular filling flower pots and the like with potting soil. A potting and repotting machine is known substantially comprising an elongated bin which is open at the top and wherein an endless chain conveyor is present which is fitted with carriers extending transversely to the transport direction.

In this prior art apparatus each carrier of the chain conveyor is adapted for taking up one or more pots, e.g. designed as an assembly of a plurality of pot retaining rings, each adapted for receiving a fitting pot. The top part of the conveyor chain during operation runs underneath a filling device from which soil is deposited in pots which are positioned in the rings and it is possible to conduct the thus filled pots underneath a boring device which bores a flat hole in the potting soil. The pots, upstream of the filling device, are positioned in the rings in the upper part of the chain conveyor and at the end of the conveyor removed therefrom by hand and for instance placed on a supply conveyor of a seed dosing device. In the lower part of the chain conveyor the carriers are adapted to push on any spilled potting soil that has fallen on the bottom of the elongated bin towards a storage bin from which an elevator supplying the filling device is fed.

Such a prior art potting and repotting machine has the advantage that, depending on the number of pot retaining rings in each of the carriers of the chain conveyor, more rows of pots can be simultaneously treated. However, a drawback is that all rings have to be replaced when a different pot size has to be used, which is time-consuming, while moreover a large quantity of rings in various sizes has to be kept in stock.

It is the object of the present invention to remove this drawback.

To this effect the potting and repotting machine according to the invention is provided with at least one continuous pot guideway extending in longitudinal direction of the bin and having a variable width and depth, and the carriers of the endless chain conveyor are designed as pushing members extending in the upper part of the chain, above the bottom level of the guideway or guideways.

The potting and reporting machine according to the present invention is universal not only with respect to pot sizes but also of pot shapes, so that not only round flower pots but also elongated or square flower pots can be filled by means of the machine. The dosing of pots at the feeding-in end of the conveyor need not be effected as accurately as is the case in annular pot receiving means, since a pot positioned in the guideway will always be engaged by a carrier means. In case of a plurality of rows of longitudinal guideways, the pots need not be positioned accurately side by side in the various rows either, since the carriers common for all rows automatically ensure the accurate orientation of the pots transversely to the longitudinal direction, before these arrive at the filling device.

In a preferred embodiment of the present invention, each longitudinal guideway is fitted with two longitudinally extending upper beams, each constituting a lateral guideway for a row of pots and whose interspace is variable, as well as a central vertically adjustable bottom beam. The longitudinal beams may for instance be fixed between the end walls of the elongated bin, whereby they may extend at the discharge end beyond the bin, which ensures a simple transfer of filled pots on a discharge conveyor.

Furthermore, according to the present invention, the bottom beams may constitute the longitudinal bars of a grid whose cross bars are connected to elevator means for controlling the depth of the guideway. Since in this manner it is possible to effect the vertical adjustment of the bottom beams from aside, the carriers, as is the case in the prior art machine, in the lower part of the chain conveyor can scrape over the bottom of the bin for discharging spilled potting soil.

The elevator means may comprise sloping slots in the upright sidewalls of the elongated bin, through which extend cross-beam ends and which can be fixed at any desired level. Preferably the elevator means however are designed as bell crank levers, of which at least one is adjustable while the others are mounted for free rotation.

One embodiment of the potting and repotting machine according to the present invention will now be described, by way of example, with reference to the accompanying drawing in which FIG. 1 is a diagrammatic side view, partly in cross-section, of a potting and repotting machine and FIG. 2 is a cross-section on the line II—II in FIG. 1.

As shown in the drawing a potting and repotting machine is provided with a pot conveyor substantially comprising an elongated bin having a bottom 1, upright sidewalls 2, while the bin contains an endless chain conveyor.

Furthermore there is diagrammatically shown a filling device provided with feed hoppers 3 which are fed by an elevator 4. At the right-hand end in FIG. 1 of the elongated bin 1,2 there is shown a potting soil storage bin 5 which feeds the elevator 4 via a distribution member 6. Since the filling device does not form part of the present invention, it will not be further discussed in detail. It is only mentioned that each time after a row of pots 7 to be filled has arrived underneath hoppers 3, a quantity of soil is deposited in the pots.

The endless chain conveyor is fitted in the depicted embodiment with two chains, each disposed adjacent a sidewall 2 of the bin 1,2 and conducted over chain wheels, of which only the chain wheels 8 are shown at the feeding-in end of the conveyor. The chains 9 are interconnected by transversely extending carrier members 10. In the upper part of the chain 9 the members 10 entrain pots 7 in the direction of the discharge end, as indicated by arrow P, which pots are positioned in three longitudinally extending guideways.

For each guideway there is disposed a pair of longitudinal beams 11 which are fixed at the feeding-in end of the conveyor through clamps 12 on a division plate 13. At the discharge end there is mounted a similar clamping means, not shown, for the longitudinal beams 11. For tensioning the longitudinal beams 11 use may be made of a nut 14. For adaptation to various pot widths, the lateral space between longitudinal beams 11 of a guideway may be adjusted by loosening the nut 14 and re-fastening the nut in the new position of the longitudinal beams.

Pots 7 positioned between a pair of longitudinal beams 11 rest on a bottom beam 15 the height of which is adjustable. The beams 15 constitute the longitudinal bars of a bottom grid of which cross-bars 16 are rotatably connected to bell crank levers 17, which are again connected to cross-bars 18 extending between the upright sidewalls 2 and rotatably mounted therein. The position of at least one of the bell crank levers 17 is adjustable by means of the cross-bar 18 and a lever 19. Through lever 19 it is consequently possible to simply vary the level of the bottom beams 15. The height adjustment of bottom beams 15 is preferably so chosen relative to the lateral space between each pair of longitudinal guide beams 11 that a pot 7 completely rests on a bottom beam 15 and is not clamped between the associated cross-beams. As a result when manually or mechanically supplied pots 7 are engaged by a carrier 10, the pots 7 will not be overturned about the point contacts with the longitudinal beams. Longitudinal beams 11 therefore function purely as side guideways, while the weight of the pots 7 completely rests on bottom beams 15 with which the pots make at least line contact.

It will be clear that by means of the potting and repotting machine according to the present invention not only pots of various sizes can be supplied to the feed hopper 3, but also elongated plant boxes and the like. Empty pots 7 need not be placed in the machine in a row oriented purely transverse to the transport direction, since the carriers 10 automatically ensure a pure transverse orientation. Adaptation to various pot sizes does not require the provision of a stock of pot holders. The switching over to a different pot size is effected by simple adjustment of the interspace between longitudinal beams 11 and height adjustment of the bottom beams 15. In the lower part of said chains 9, carriers 10 effect the pushing forward of spilled potting soil over the bottom 1 of the elongated bin to the potting soil reservoir 5.

I claim:

1. In a potting and repotting machine which forms part of an apparatus for filling pots, in particular filling with potting soil of flower pots and the like, said machine being provided with an elongated bin which is open at the top and accommodating an endless chain conveyor fitted with carriers extending transversely to the transport direction, the improvement comprising at least one continuous pot guideway extending in longitudinal direction of the bin, and having a variable width and depth, the carriers of the endless chain conveyor comprising pushing means to push the pots along the pot guideway, said carriers extending in the upper part of the chain above the bottom level of the guideway or guideways.

2. A machine according to claim 1, wherein each longitudinal guideway comprises two longitudinally extending top beams, which each constitute a side guideway for a row of pots, and means to vary the lateral space between said top beams, and a central bottom beam adjustable in height.

3. A machine according to claim 2, wherein the bottom beams constitute the longitudinal bars of a grid comprising cross-bars, of which said cross-bars are connected to lifting means to effect said adjustment in height of said bottom beam.

4. A machine according to claim 3, wherein said lifting means for the bottom beams comprise inclined slots in the upright sidewalls of the elongated bin, through which slots extend cross-bar ends which can be fixed at any desired level.

5. A machine according to claim 3, wherein said lifting means comprise a plurality of bell crank levers, of which at least one is adjustable and the others of which are mounted for free rotation.

6. A potting and repotting machine provided with an elongated trough open at the top, an endless chain conveyor extending in the trough having longitudinally spaced and transversely extending carriers for at least two pots in side-by-side relationship, a filling device for sequentially depositing soil in pots passing thereunder, a storage bin for potting soil and a vertical conveyor supplied from said storage bin and for supplying the filling device, the improvement wherein the potting and repotting machine is provided with at least two longitudinal guideways for the pots to be filled, comprising longitudinally extending side guide beams and a pair of vertically adjustable bottom beams, the bottom beams being interconnected to form a grid which is entirely adjustable in height by means of bell crank levers each having one end connected to said grid and another end rotatably mounted relative to the upright bin sidewalls, the transversely extending carriers of the chain conveyor being located in the upper run of said chain of a height lower than the level of the side guideways and above the adjustable level of the bottom guideways.

7. A machine according to claim 2, wherein said means to vary the lateral space between said top beams comprises means to fix each of said longitudinally extending top beams adjacent the two ends of the conveyor, said fixing means comprising a laterally extending division plate and clamp means for releasably retaining each of said top beams in a selected lateral position on said division plate.

* * * * *